US010199909B2

United States Patent
Pacciani et al.

(10) Patent No.: US 10,199,909 B2
(45) Date of Patent: Feb. 5, 2019

(54) ISOSTATIC BRUSH HOLDER FOR ROTATING ELECTRICAL SLIP RING ASSEMBLIES

(71) Applicant: CONDUCTIX—WAMPFLER S.R.L., Agrate Brianza (IT)

(72) Inventors: Federico Pacciani, Agrate Brianza (IT); Fabio Usuelli, Agrate Brianza (IT)

(73) Assignee: CONDUCTIX—WAMPFLER S.R.L., Milan (IT)

( * ) Notice: Subject to any disclaimer, the term of this patent is extended or adjusted under 35 U.S.C. 154(b) by 117 days.

(21) Appl. No.: 15/197,894

(22) Filed: Jun. 30, 2016

(65) Prior Publication Data

US 2017/0005550 A1  Jan. 5, 2017

(30) Foreign Application Priority Data

Jul. 2, 2015 (IT) .............................. UB2015A1843

(51) Int. Cl.
*H02K 13/00* (2006.01)
*H02K 13/10* (2006.01)
*H01R 39/38* (2006.01)
(Continued)

(52) U.S. Cl.
CPC ....... *H02K 15/0006* (2013.01); *H01R 39/385* (2013.01); *H01R 39/40* (2013.01);
(Continued)

(58) Field of Classification Search
CPC .......... H02K 5/14; H02K 5/141; H02K 5/143; H02K 5/145; H02K 5/146; H02K 5/148;
(Continued)

(56) References Cited

U.S. PATENT DOCUMENTS 1,698,799 A * 1/1929 Leland ................... H02K 27/10
310/167
1,764,709 A * 6/1930 Anderson .............. H02K 27/10
310/167
(Continued)

FOREIGN PATENT DOCUMENTS

EP      0087190 A1   8/1983
GB      1172907 A  * 12/1969 ............. H01R 39/38
(Continued)

OTHER PUBLICATIONS

Office Action from priority Italian Application No. UB2015A001843, dated Feb. 15, 2016 (9 pages).

*Primary Examiner* — Quyen P Leung
*Assistant Examiner* — Eric Johnson
(74) *Attorney, Agent, or Firm* — Abelman, Frayne & Schwab (57) ABSTRACT

An isostatic brush holder (10) comprises a central body (12), one or more arms (14, 14') rotationally disposed in proximity of the opposite ends of said central body (12), and defining a first and a second end (16, 16'), and a plurality of brushes (20) cooperating with at least one elastic element (22), where said arms (14, 14') define the respective first ends (16) of quick release snap catches (24, 24'), said arms being pivoted to each other at the second ends (16'), said arms being further connected in a swivelling manner and in proximity to said second ends (16') at the opposite ends of said central body (12).

8 Claims, 6 Drawing Sheets (51) Int. Cl.
 *H02K 15/00* (2006.01)
 *H01R 39/40* (2006.01)
(52) U.S. Cl.
 CPC ........... *H02K 13/003* (2013.01); *H02K 13/10* (2013.01); *H01R 39/381* (2013.01)
(58) Field of Classification Search
 CPC ...... H02K 13/00; H02K 13/003; H02K 13/10; H01R 39/38; H01R 39/381; H01R 39/383; H01R 39/385; H01R 39/40; H01R 39/41
 USPC .................................................. 310/238–247
 See application file for complete search history.

(56) References Cited

U.S. PATENT DOCUMENTS

| | | | | |
|---|---|---|---|---|
| 2,282,450 A * | 5/1942 | Brettell, Jr. | ............ | H01R 39/38 310/246 |
| 2,299,376 A * | 10/1942 | Buerosse | ............... | H01R 39/38 310/244 |
| 2,463,097 A * | 3/1949 | Gayer | .................... | H02K 5/148 310/239 |
| 2,475,276 A * | 7/1949 | Briggs | ................... | H02K 23/66 310/240 |
| 3,968,391 A * | 7/1976 | Blank | .................... | H02K 5/141 310/240 |
| 6,084,331 A | 7/2000 | Reinhardt | | |
| 2011/0115331 A1 | 5/2011 | Yu | | |
| 2013/0057109 A1* | 3/2013 | Yu | ........................ | H01R 39/385 310/244 |
| 2015/0222067 A1* | 8/2015 | Bichler | .................. | H01R 39/08 310/239 |

FOREIGN PATENT DOCUMENTS

| | | |
|---|---|---|
| GB | 2461533 A | 1/2010 |
| WF | 2013182938 A1 | 12/2013 |

* cited by examiner

ISOSTATIC BRUSH HOLDER FOR ROTATING ELECTRICAL SLIP RING ASSEMBLIES

This invention relates to an isostatic brush holder for rotating electrical slip ring assemblies.

More particularly, this invention relates to an isostatic brush holder for conductive rotating slip ring assembles for the transmission of electrical power and signal currents.

In the electro-mechanical and electro-mechanical construction industry, rotating electrical slip ring assemblies (also called distributors or rotating joints) are known for the transmission of an electric power, control or signal current from a static structure to a structure suitable to be set in 360° rotation in a continuous and discontinuous manner, in both directions. Said known rotating slip ring assemblies are typically composed of a cylindrical or square cage stator structure with a plurality of longitudinal rods with a section that is circular, rectangular, square etc., diametrically or diagonally arranged and closed at the ends by two heads defining two generally rolling support elements and comprising the related electrical connections with the conductive rings. Inside of the stator structure of said rotating slip ring assembly is rotatably disposed, on said rolling supports, a rotor part comprising a shaft, typically hollow to also allow allows the passage of technical hoses, with a multiplicity of conductive radial rings, insulated from each other and suitable to be engaged by a plurality of sliding electrical brushes made of copper-graphite or other conductive material. Said slip ring assembles further comprise a plurality of brush holders disposed and stabilised on the stator part of the slip ring assembly, in correspondence of said rods with circular cross section and suitable to keep the brushes engaged in sliding contact with the outer diametral surface of said conductive rings. The known types of brush holders are typically composed of a central body, with one or more holes, suitable to stably engage with a rod of the rotating slip ring assembly in correspondence of a conductive ring of the same assembly. At the opposite ends of said central body are rotationally pivoted, in the direction radial to the rotation axis of the slip ring assembly, one or more arms on each of which, in correspondence of the surface facing the slip ring assembly, are stabilised or housed the brushes and related conductors electrically connected to a terminal block. Said brush holders generally comprise at least one elastic element connected at the ends to said arms of the brush holder, in such a way as to induce them and the brushes to rest, with a determined pressure, against the diametral surfaces of the conductive rings, compensating for the progressive wear of the brushes themselves. In other construction solutions, two arms in the form of elastic plate depart directly from the central body of the brush holder, on the free end of which the brushes are stabilised. Said arms, by flexing, keep the brush pressed against the sliding surface of the conductive ring, which in this case is generally formed by a disc.

A typical example of brush holder is described in British patent GB 2 461 533 (A) which claims a method for the estimation of the wear rate of the brushes in a rotating slip ring assembly for wind turbines. The condition of the brushes is monitored and controlled by means of a wear index, obtained from the measurement of the rotation speed of the rotor and the current over time. Said wear index value can be used for scheduling maintenance, and can be used to control the environmental conditions around the brushes and the rings of the assembly, such as pressure, temperature and humidity, to prolong the life of the brush. The control of environmental conditions can for example comprise the change in velocity of a fan in order to control the flow of air through the rotating slip ring assembly.

Another typical example of brush holders for rotating electrical slip ring assemblies is described in United States patent application US 2011/0115331 (A1), which claims a brush holder assembly of a conductive ring of a rotating electrical slip ring where said brush holder assembly comprises a base having two inclined rails on each of which is slidably disposed a brush, in both directions. Two elastic elements are mounted on said base in such a way as to induce and maintain the brushes towards, and in contact with, the conductive ring.

However, said known brush holders for rotating electrical slip ring assemblies have drawbacks and limitations of use.

A limit of said known brush holders is due to the difficulty of maintenance and replacement of the electric brushes, operations that require the disassembly of the entire brush holder assembly and the extraction of the same from the rotating slip ring, as well as the intervention of specialised operators and prolonged machine downtime.

A further drawback of said known brush holders is due to the fact of being structurally labile mechanical systems with the arms connected to the central body, rotationally free to rotate with the free end with respect to respective fulcrums, and thus subject to positioning that are not always correct.

A further drawback of the cited brush holders for rotating slip ring assemblies is due to the fact of being subject to the overturning of the "pivoting" boxes in which the electrical brushes are slidably disposed, when there are conditions of superficial micro-welding between the brush and the diametral sliding surface of the conductive ring due to a prolonged inactivity of the rotating slip ring. Said superficial microwelds prevent the ring from freely sliding with the electric brush trying to bring it in rotation and transferring momentum to it in the direction tangential to the surface of the conductive ring, which tends to overturn the box and related electrical brush from their normal working position in contact with the conductive ring.

The purpose of this invention is to overcome the drawbacks listed above.

More particularly, the purpose of this invention is to provide a brush holder for isostatic rotating electrical slip ring assemblies that allows a better adherence of the brushes on the rotating conductive ring.

A further purpose of this invention is to make available to users an isostatic brush holder for rotating electrical slip ring assemblies that allows the rapid and simple maintenance and replacement of the brushes, without the use of specialised operators.

Another purpose of this invention is to provide an isostatic brush holder for rotating electrical slip ring assemblies with an improved resistance to vibration.

A still further purpose of this invention is to make available to users an isostatic brush holder for rotating electrical slip ring assemblies that is economical to manufacture and simple to assemble.

These and still other purposes are achieved by the isostatic brush holder for rotating electrical slip ring assemblies of this invention according to the main claim.

The constructive and functional characteristics of the isostatic brush holder for rotating slip ring assemblies of this invention will be better understood from the following detailed description, in which reference is made to the accompanying drawings that illustrate a preferred and non-limiting embodiment and in which.

Figure 1:
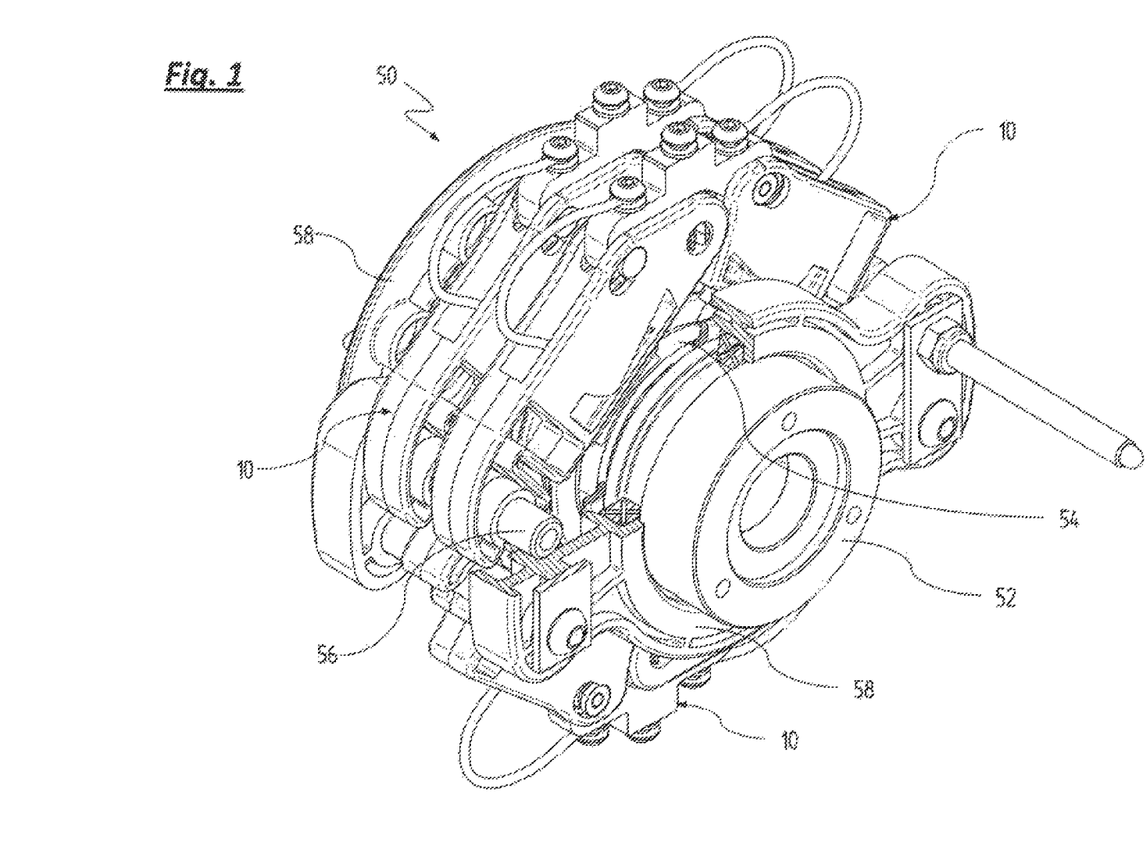
FIG. 1 is an axonometric and partially sectioned schematic representation of a plurality of isostatic brush holders for the rotating electrical slip ring assembly of the invention, installed on the pack of conductive rings of a rotating slip ring assembly of known type.
Figure 2:
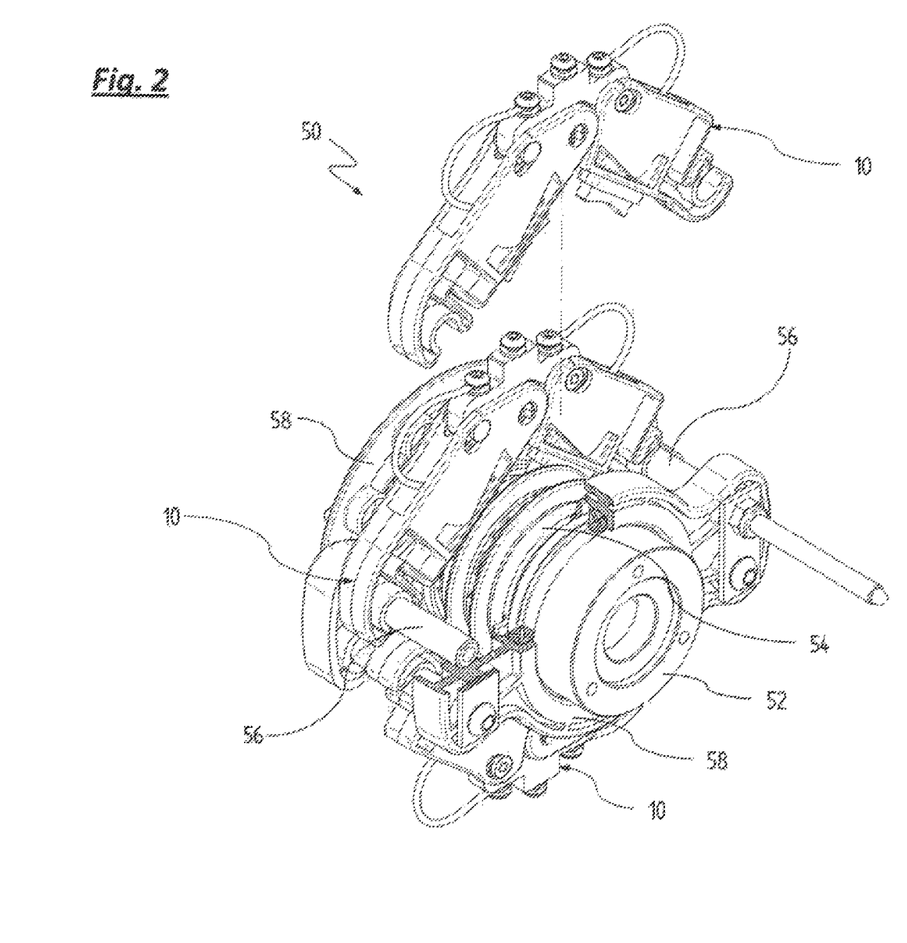
FIG. 2 is an axonometric, partially exploded schematic and partially sectioned representation of a plurality of isostatic brush holders for the rotating electrical slip ring assembly of the invention, installed on the pack of conductive rings of a rotating slip ring assembly of known type.
Figures 3A, 3B:
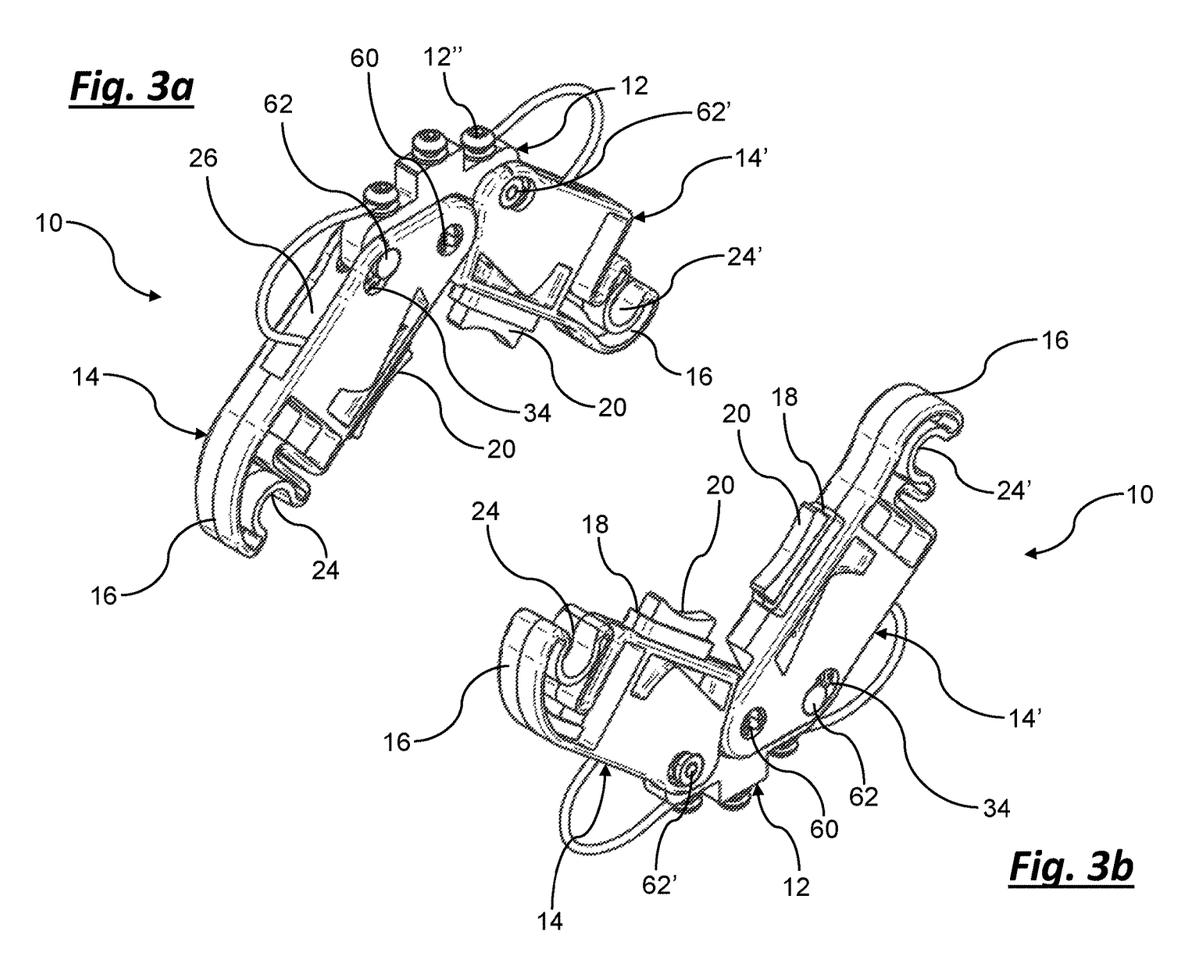
FIGS. 3a and 3b are axonometric schematic representations from different perspectives of the isostatic brush holder for the rotating electrical slip ring assembly of the invention.
Figure 4:
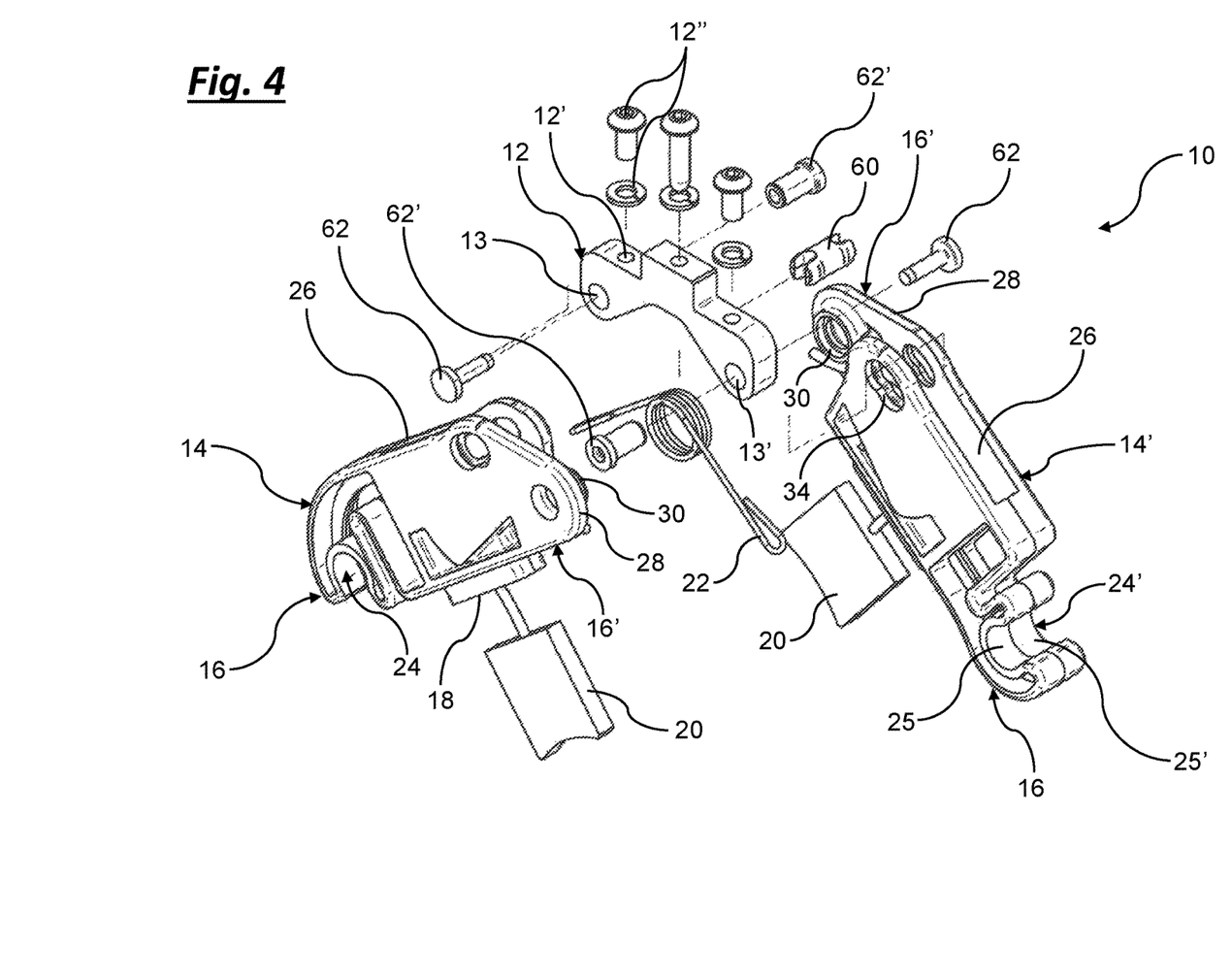
FIG. 4 is an exploded schematic axonometric representation of the isostatic brush holder for rotating electrical slip ring assembly of the invention.
Figure 5:
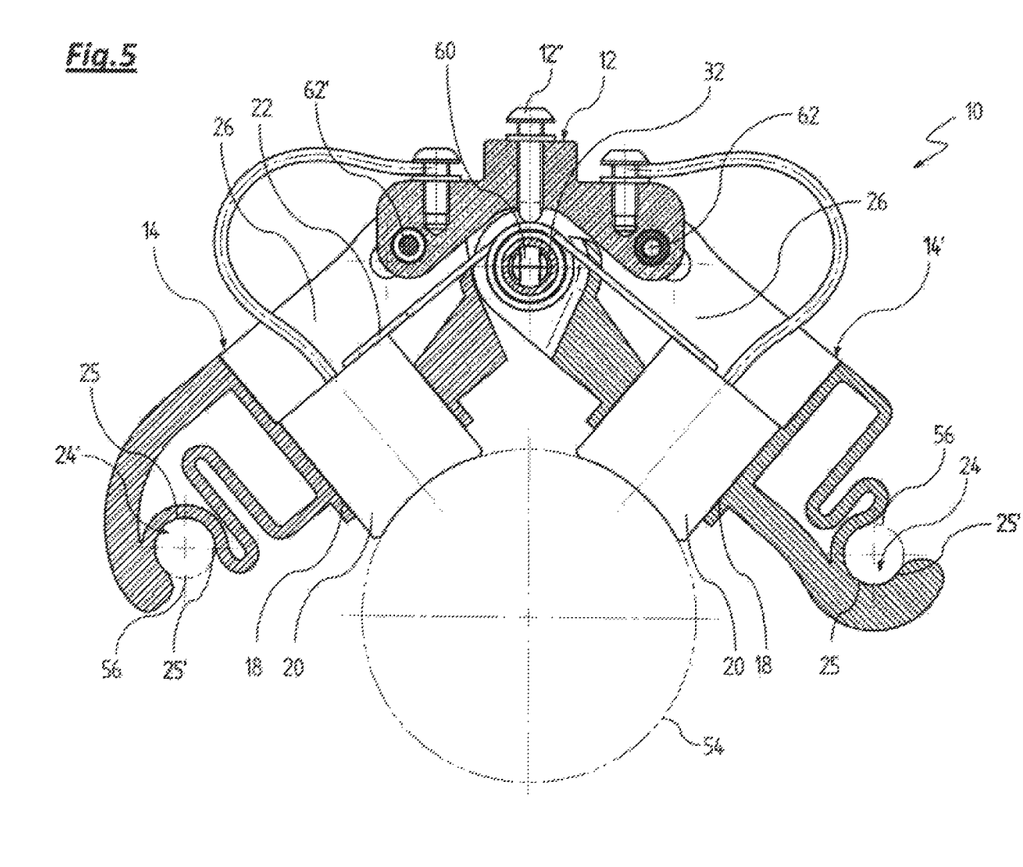
FIG. 5 is an axonometric schematic representation of a sectional view of the isostatic brush holder for rotating electrical slip ring assembly of the invention.

With initial reference to FIGS. 1 and 2, a plurality of isostatic brush holders for the rotating electrical slip ring assembly of the invention, indicated as a whole with 10, are stabilised and isostatically bound to a rotating electrical slip ring 50, each of at least two rods 56 and disposed in correspondence of a plurality of conductive rings 54 disposed on the rotating part 52 of said slip ring 50. With particular reference to FIGS. 3 to 5, the brush holder 10 of the invention comprises:
  a central body 12 made of conductive material, generally brass, provided with a plurality of fixing means 12', 12" for the connection of the ends of the electrical conductors of the brushes with the external electrical conductors, and a plurality of connection openings 13, 13', or pass-through holes, disposed transversally and in correspondence of the opposite ends of the same central body 12;
  one or more arms 14, 14', rotationally disposed in proximity of the opposite ends of said central body 12, said arms each defining a first and a second end 16, 16';
  at least one brush 20 slidably disposed in a housing 18 inside each arm 14, 14';
  at least one elastic element 22, which cooperates with said at least one brush 20.

Said brush holder 10 presents the following innovations: said arms 14, 14', define, on the respective first ends 16, quick couplings 24, 24', the same arms being pivoted to one another and rotationally movable with respect to one another in correspondence of the second ends 16'. Said arms 14, 14' are further connected, in a pivoting manner and in proximity to said second ends 16', at the opposite ends of said central body 12.

With reference to the same figures, said quick couplings 24, 24' of said arms 14, 14' are advantageously formed by a snap-opening 25 having open circular section on one side and disposed transversely with respect to the longitudinal extension of said arm 14, 14'. Said snap-opening defines a portion of restricted inlet 25', with respect to the diametral surface of its circular section, and suitable to elastically deform to receive the outer diametral surface of the rod 56.

The same snap-opening 25 of said quick couplings 24, 24' is formed on the outer surface of said arm 14, and open with respect to the same surface, in such a way as to be accessible in a direction substantially opposite to the corresponding snap-opening of the other arm 14'.

With particular reference to FIGS. 3 to 4, said second ends 16', of the arms 14, 14', define a fork formed longitudinally by means of a central flange face 26 placed in communication with said housing 18, formed on said arm 14, 14' in the transverse direction towards the portion suitable to face the conductor ring 54 of the rotating slip ring 50. In correspondence of one of said branches of said fork of the arm 14, 14' is longitudinally developed an extended flap 28 on which is formed a tubular appendage 30 developed in a transverse direction towards the inner part of the fork itself and for a length equal to about half the thickness of said arm 14, 14'. With particular reference to FIG. 4, said tubular appendage 30 of said arm 14 defines, in cooperation with the corresponding tubular appendage 30 of another arm 14', a tubular rotation hinge 32, on the outer surface of which is coaxially and rotatably disposed the elastic element 22 and on the inner diametral surface of the tubular hinge 32 is rotatably disposed a cardinal pin 60, generally formed by a pin or the like provided with known self-locking means such as notches, rings, threads etc., and suitable to rotationally connect said arms 14, 14'.

With reference again to FIGS. 3a to 5, on said second ends 16 of the arms 14, 14' is transversely formed a slot-shaped through-hole 34, placed in sliding cooperation with said through openings 13, 13' of said central body 12 by means of known fixing pins 62, 62'. Said fixing pins 62, 62', generally comprising male pins and female pins of deformable plastic material, are disposed in axial co-operation in said through openings 13, 13'. Said shaped slot 34 is slidably pivoting with respect to said body 12, in correspondence of said through openings 13, 13' and of said fixing pins 62, 62', said shaped slots 34 being suitable to translate with respect to them in such a way as to allow the pivoting of said arms with respect to the fixing pins 62, 62'.

With particular reference now to FIGS. 4 and 5, said elastic element 22 can be advantageously made from a spiral torsion spring having two straight ends terminating with the folded flaps, suitable to abut the said brushes 20 in correspondence of an upper surface opposite to the sliding surface of the brushes 20 themselves, in order to induce them to come out from said cavity 18. The arms 14, 14' can be made of electrically insulating material, light and such as to give the brush holder 10 a reduced mass. Said material can advantageously be a plastic-polymer or sintered plastic material, realisable mechanically by moulds or by sintering powders. From the description of the constituent parts, the isostatic brush holder 10 for rotating electrical slip ring assembles of the invention, one can infer its operation, described below.

With reference to FIGS. 1, 2, 5, and 6, the brush holder is advantageously installable on a rotating electric slip ring 50 without the need to disassemble it, by decoupling the heads of the stator part 58 of the slip ring, in order to pull out the brush holder 10 from the rods 56 as it is the case for the brush holders of the prior art.

Figure 6:
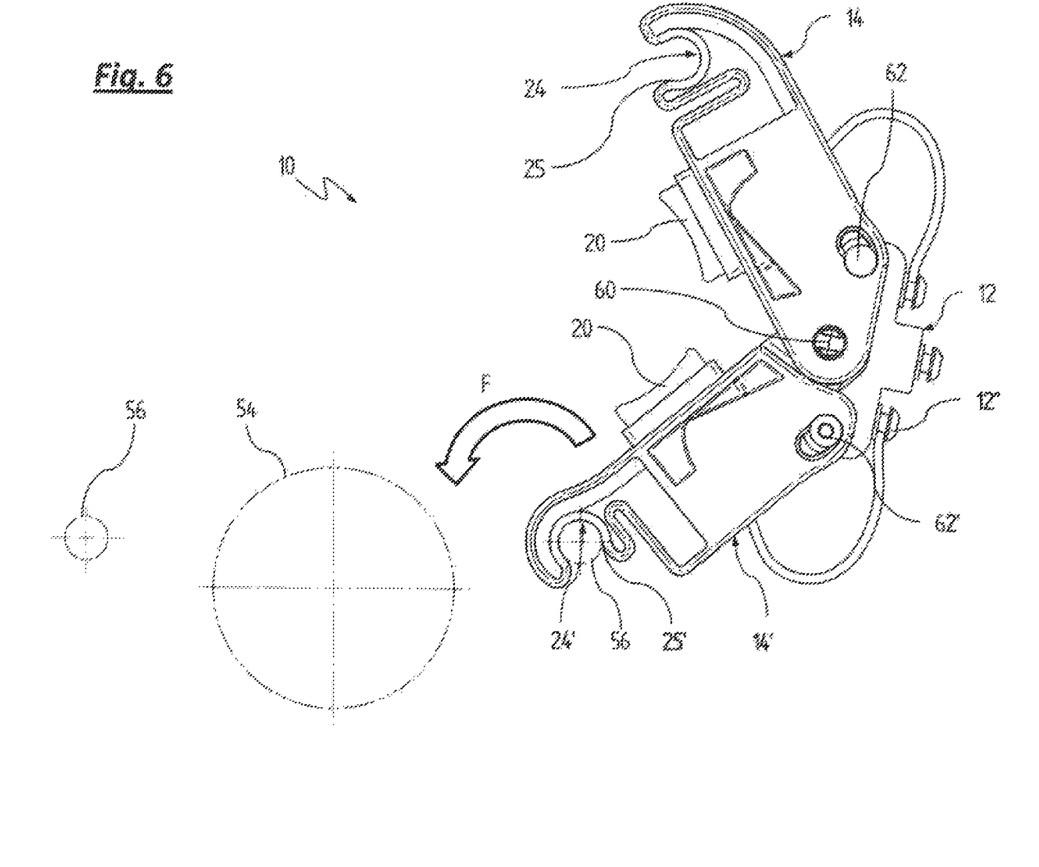
FIG. 6 is an axonometric schematic representation of a sectional view of the isostatic brush holder for rotating electrical slip ring assembly of the invention in a mounting configuration.

With particular reference to FIGS. 5 and 6, the brush holder 10 can be easily and quickly installed, without the aid of a specialised operator, by bringing the brush holder 10 to the position shown in FIG. 6 and hooking it to a rod 56 with the arm 14' in correspondence with the snap opening 24' with a pressure of the same on the outside diameter of the rod 56. Subsequently, by rotating the brush holder according to the direction identified in FIG. 6 by the arrow F, it is brought to abut the opposite rod 56 and to stably attach the brush holder 10 in correspondence of the snap-opening 24 opposite to the first shutter with a pressure of the same on the outer diameter of the respective rod, according to the configuration shown in FIG. 5. The brush holder 10 is constrained in an Isostatic manner with respect to said slip ring, having all the parts of the structure stably placed between them and with the structure of said rotating slip ring. The brushes 20 are free to move linearly inside the housings 18 of the arms 14, 14', pushed by the elastic element 22, and induced to abut with their sliding surface, suitably radiused, the outer diametral surface of the conductive ring 54 of the slip ring 50. The arms 14, 14' are hinged to each other in correspondence of the tubular hinge 32 and are free to pivot with respect to the fixing pins 62, 62' disposed in the connection openings 13 and 13' of the central body 12, so as to self-centre automatically and symmetrically with said central element 12 and bring the brushes perpendicular to the diametral surface of the conductive ring 54. This simplified arrangement allows the central part 12 to be released from the structure of the rotating slip ring and to function only as a structural connection bridge between the two arms and as a support for the end lugs of the incoming wires to the brushes 20. The same simplified disposition allows a greater adaptability of the slip ring to the brush holder providing it, at the same time, also thanks to the low weight of the materials, to be inertially less subject to the vibrational motion coming from the rotating slip ring. The same disposition with the arms 14, 14' fastened to rods 56 by means of their ends 16 opposite the central body 12, allows the same arms to not be subject to overturning when, following prolonged non-use of the slip ring, the brush 20 tends to be superficially welded with the surface of the conductive ring 54 and to be brought in rotation with the ring itself.

As can be seen from the foregoing, the advantages of the isostatic brush holder for rotating electrical slip ring 10 of this invention are evident.

The isostatic brush holder for rotating electrical slip ring 10 of this invention is particularly advantageous because it has a "bridge" structure that allows obtaining an increased adherence of the brushes on the rotating conductive ring.

A further advantage of the isostatic brush holder for rotating electrical slip ring 10 of this invention is to allow quick and simple assembly and disassembly of the entire body of the brush holder without the need to disassemble the heads of the rotating slip ring and without the use of tools and specialised operators.

A further advantage of the isostatic brush holder for rotating electrical slip ring 10 of this invention is represented by the fact of having a light isostatic structure, without labile parts able to move and such as to resist vibrations.

A still further advantage for the brush isostatic holder for rotating electrical slip ring 10 of this invention is represented by the fact of having the arms 14, 14' easily and economically realisable, adaptable and adjustable for different sizes of rotating slip rings and brushes.

Although the invention has been described with particular reference to a preferred embodiment, provided only by way of non-limiting example, many modifications and variations will be apparent to a person skilled in the art in light of the above description. Therefore, this invention intends to embrace all the modifications and variants falling within the spirit and scope of the following claims.

The invention claimed is:

1. A brush holder (10) comprising a central body (12) made of conductive material provided with a plurality of fixing means (12', 12") for electrical connections and a plurality of through connection openings (13, 13') disposed transversely and in correspondence of the opposite ends of said central body (12), one or more arms (14, 14') rotationally disposed in proximity of the opposite ends of said central body (12) and defining a first and a second end (16, 16'), at least one brush (20) slidably disposed in a housing (18) inside the same arm (14, 14'), said brushes (20) being cooperating with at least one elastic element (22); characterised in that said arms (14, 14') define on the respective first ends (16) quick release snap-catches (24, 24'), said arms being pivoted to each other at the second ends (16'), said arms being further connected in a swivelling manner and in proximity to said second ends (16') at the opposite ends of said central body (12), characterised in that said second ends (16'), of the arms (14, 14'), define a fork formed longitudinally by means of a central flange face (26) placed in communication with said housing (18), formed in the transverse direction on said arm (14, 14'), further characterised in that on a branch of said fork of the arm (14, 14') is longitudinally developed an extended flap (28) on which is formed a tubular appendage (30) developed in the transverse direction towards the inner part of said fork for a length equal to about half the thickness of said arm (14, 14'), and further characterised in that said tubular appendage (30) of said arm (14) defines, in cooperation with the corresponding tubular appendage (30) of another arm (14'), a tubular rotation hinge (32), on the outer surface of which is coaxially and rotatably disposed the elastic element (22) and on the inner diametral surface of said tubular hinge (32) is rotatably disposed a cardinal pin (60), suitable to rotationally connect said arms (14, 14').

2. The brush holder (10) according to claim 1, characterised in that said quick release snap-catches (24, 24') of said arms are formed by a snap-opening (25) having a circular arc and being disposed transversely with respect to the longitudinal extension of said arm (14, 14'), said snap-opening defining a portion of restricted inlet (25') with respect to the diametral surface of its circular section.

3. The brush holder (10) according to claim 2, characterised in that said snap-opening (25) of said quick release snap-catches (24, 24') is formed on the outer surface of said arm (14), and open with respect to it in such a way substantially opposite to the corresponding snap-opening of the other arm (14').

4. The brush holder (10) according to claim 1, characterised in that in proximity of said second ends (16') of the arms (14, 14') is transversely formed a slot-shaped through hole (34), placed in sliding cooperation with said through openings (13, 13') of said central body (12) by means of fixing pins (62, 62') arranged in said through openings (13, 13'), said shaped slot (34) being slidably pivoting with respect to said central body (12) in correspondence of said through openings (13, 13') and said fixing pins (62, 62').

5. The brush holder (10) according to claim 1, characterised in that said elastic element (22) comprises a torsion spring with two straight ends suitable to abut said brushes (20) inside said housing (18) and in correspondence of an upper surface opposite the sliding surface of the same brushes (20).

6. The brush holder (10) according to claim 1, characterised in that said arms (14, 14') are made of light material.

7. The brush holder (10) according to claim 1, characterised in that said arms (14, 14') are made of plastic-polymer or sintered material.

8. A rotating electrical slip ring (50) comprising at least one brush holder (10) according to claim 1.

* * * * *